(12) United States Patent
Omura (10) Patent No.: US 12,517,573 B2
(45) Date of Patent: Jan. 6, 2026

(54) ELECTRONIC DEVICE, NOTIFICATION METHOD AND STORAGE MEDIUM

(71) Applicant: CASIO COMPUTER CO., LTD., Tokyo (JP)

(72) Inventor: Tatsuyoshi Omura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/785,779

(22) Filed: Jul. 26, 2024

(65) Prior Publication Data
US 2025/0036191 A1    Jan. 30, 2025

(30) Foreign Application Priority Data
Jul. 28, 2023    (JP) ................................. 2023-123279

(51) Int. Cl.
*G06F 3/01*      (2006.01)
*G06F 1/16*      (2006.01)

(52) U.S. Cl.
CPC ............ *G06F 3/011* (2013.01); *G06F 1/1656* (2013.01)

(58) Field of Classification Search
CPC .............................. G06F 3/011; G06F 1/1656
See application file for complete search history.

(56) References Cited

U.S. PATENT DOCUMENTS

| | | | |
|---|---|---|---|
| 2004/0127198 A1* | 7/2004 | Roskind | H04M 19/044 |
| | | | 455/412.2 |
| 2017/0003879 A1* | 1/2017 | Tamai | G06F 3/0481 |
| 2017/0213525 A1* | 7/2017 | Tamegai | H04W 4/02 |
| 2019/0064998 A1* | 2/2019 | Chowdhury | G03B 17/08 |
| 2019/0235660 A1* | 8/2019 | Kim | G06F 3/0414 |
| 2020/0104021 A1* | 4/2020 | Bylenok | G06F 3/02 |
| 2022/0398914 A1* | 12/2022 | Cardona | G06F 1/163 |

FOREIGN PATENT DOCUMENTS

| | | |
|---|---|---|
| JP | H11-136318 A | 5/1999 |
| JP | 2001-242266 A | 9/2001 |
| JP | 2008-541068 A | 11/2008 |
| JP | 2017-135510 A | 8/2017 |

* cited by examiner

*Primary Examiner* — Premal R Patel
(74) *Attorney, Agent, or Firm* — Fitch, Even, Tabin & Flannery LLP (57) ABSTRACT

An electronic device includes a notifier and a processor. The notifier is capable of performing notification in a plurality of notification modes including a first notification mode in which the notifier outputs sound and a second notification mode in which the notifier outputs not sound but other. The processor determines whether the electronic device is being used underwater, and in response to determining that the electronic device is being used underwater, switches a notification mode of the notifier from the first notification mode to the second notification mode in a case where the first notification mode is set as the notification mode of the notifier.

21 Claims, 7 Drawing Sheets

| NOTIFICATION FUNCTION | PARAMETER FOR DETERMINATION | NOTIFICATION CONDITION | | |
|---|---|---|---|---|
| | | LEVEL 1 | LEVEL 2 | LEVEL 3 |
| HEART RATE ALERT | HEART RATE r (bpm) | $100 \leq r < 120$ | $120 \leq r < 140$ | $140 \leq r$ |
| SURFACING SPEED WARNING | SURFACING SPEED s (m/min) | $9 \leq s < 13$ | $13 \leq s < 18$ | $18 \leq s$ |

FIG. 6

| | | VIBRATION INTENSITY | | |
|---|---|---|---|---|
| | | WEAK | MEDIUM | STRONG |
| VIBRATION PATTERN | A | WEAK A | MEDIUM A | STRONG A |
| | B | WEAK B | MEDIUM B | STRONG B |
| | C | WEAK C | MEDIUM C | STRONG C |

FIG. 7

| | | VIBRATION INTENSITY | | |
|---|---|---|---|---|
| | | WEAK | MEDIUM | STRONG |
| BLINKING PATTERN | LOW | WEAK LOW | MEDIUM LOW | STRONG LOW |
| | HIGH | WEAK HIGH | MEDIUM HIGH | STRONG HIGH |

| NOTIFICATION FUNCTION | LAND DEFAULT | LAND CUSTOM | UNDERWATER DEFAULT | UNDERWATER CUSTOM | | |
|---|---|---|---|---|---|---|
| | | | | LEVEL 1 | LEVEL 2 | LEVEL 3 |
| HEART RATE ALERT | SOUND | SOUND + VIBRATION (WEAK A) | VIBRATION (WEAK A) | VIBRATION (MEDIUM A) | VIBRATION (MEDIUM B) + LIGHT (LOW) | VIBRATION (STRONG C) + LIGHT (HIGH) + SOUND |
| TIMER NOTIFICATION | SOUND | SOUND + LIGHT (LOW) | VIBRATION (WEAK A) | LIGHT (LOW) | – | – |
| ALARM | SOUND | SOUND | VIBRATION (WEAK B) | VIBRATION (MEDIUM B) | – | – |
| SURFACING SPEED WARNING | – | – | VIBRATION (WEAK C) | VIBRATION (WEAK C) | VIBRATION (MEDIUM A) + LIGHT (LOW) | VIBRATION (STRONG B) + LIGHT (HIGH) + SOUND |

Labels: S1a, S1b, S2a, S2b, S2c, S3

ELECTRONIC DEVICE, NOTIFICATION METHOD AND STORAGE MEDIUM

REFERENCE TO RELATED APPLICATIONS

This application is based upon and claims the benefit of priority from the prior Japanese Patent Application No. 2023-123279, filed on Jul. 28, 2023, the entire contents, including the description, claims, abstract and drawings, of which are incorporated herein by reference.

TECHNICAL FIELD

The present disclosure relates to an electronic device, a notification method and a storage medium.

DESCRIPTION OF RELATED ART

In a conventional electronic device that is used underwater, such as a wristwatch or a dive computer, there is used a technique of notifying its user who is in water by outputting notification sound, which is disclosed, for example, in JP 2001-242266 A.

SUMMARY OF THE INVENTION

According to an aspect of the present disclosure, there is provided an electronic device including:
a notifier that is capable of performing notification in a plurality of notification modes including a first notification mode in which the notifier outputs sound and a second notification mode in which the notifier outputs not sound but other; and
a processor that
determines whether the electronic device is being used underwater, and
in response to determining that the electronic device is being used underwater, switches a notification mode of the notifier from the first notification mode to the second notification mode in a case where the first notification mode is set as the notification mode of the notifier.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter one or more embodiments of the present disclosure will be described.

First Embodiment

Figure 1:
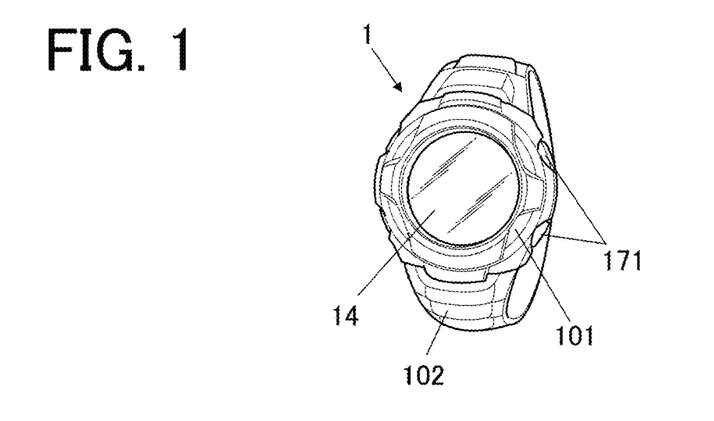
FIG. 1 shows a configuration of an electronic timepiece.
Figure 2A:
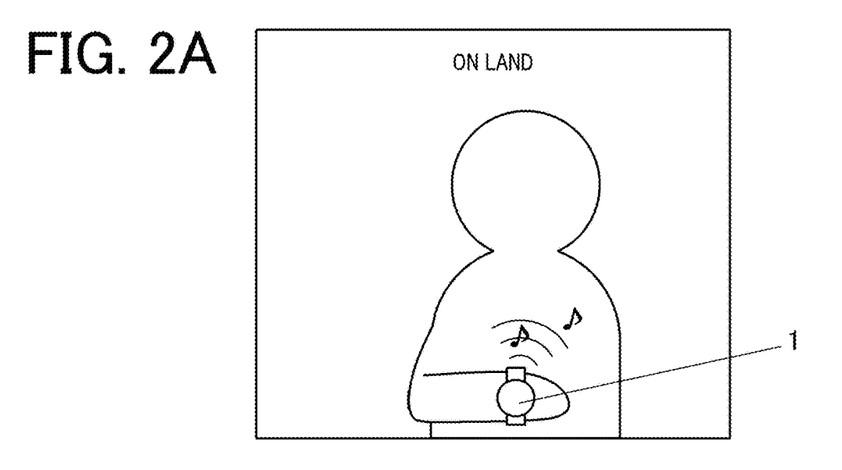
FIG. 2A is an illustration of the electronic timepiece notifying its user on land.
Figure 2B:
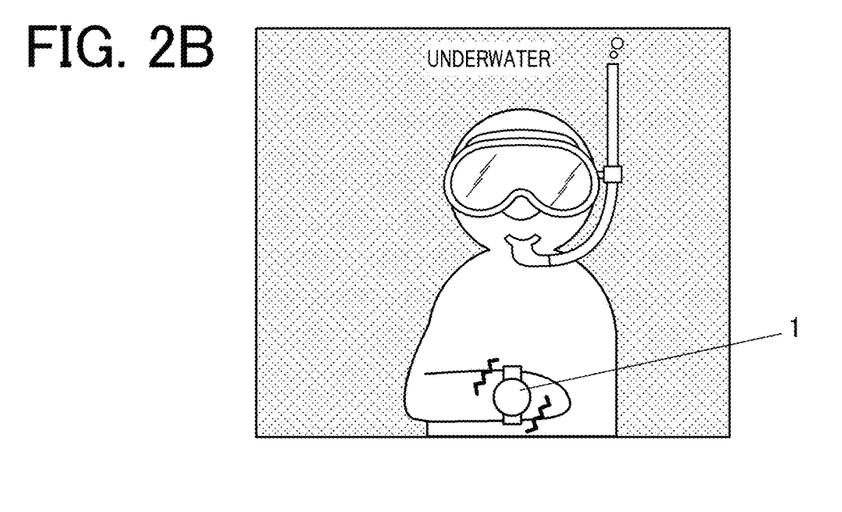
FIG. 2B is an illustration of the electronic timepiece notifying the user underwater.

FIG. 1 shows a configuration of an electronic timepiece 1.
The electronic timepiece 1 (electronic device) is a wristwatch that is used a user wearing it on his/her wrist. The electronic timepiece 1 is also a diver's watch that can be used by the user even while he/she is engaged in an underwater activity. Examples of the underwater activity include, but are not limited to, diving and swimming. The electronic timepiece 1 includes a main body 101 and a belt 102 attached to the main body 101. The main body 101 includes a display 14 and operation buttons 171. As shown in FIG. 2A, the electronic timepiece 1 can notify, on land, the user by causing its sound outputter 191 (shown in FIG. 3) to output notification sound (sound). Further, as shown in FIG. 2B, the electronic timepiece 1 can notify, underwater, the user by causing its vibrator 192 (shown in FIG. 3) to vibrate.

Figure 3:
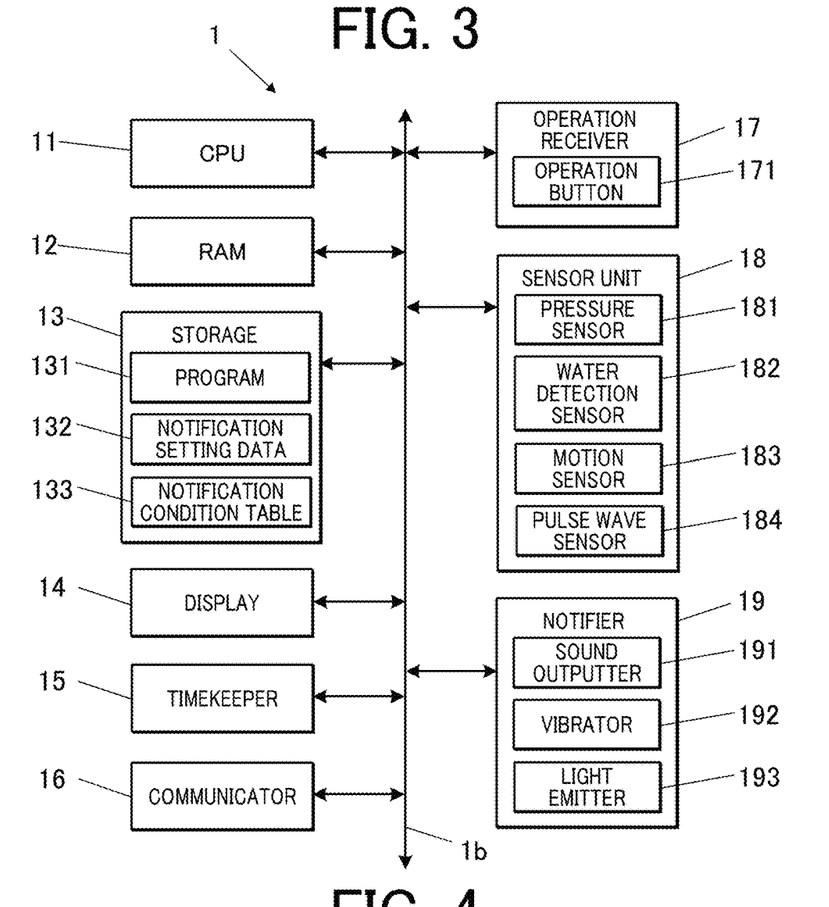
FIG. 3 is a block diagram showing a functional configuration of the electronic timepiece.

FIG. 3 is a block diagram showing a functional configuration of the electronic timepiece 1.
The electronic timepiece 1 includes a central processing unit (CPU) 11, a random access memory (RAM) 12, a storage 13, a display 14, a timekeeper 15, a communicator 16, an operation receiver 17, a sensor unit 18 (sensor(s)) and a notifier 19. These components of the electronic timepiece 1 are connected to one another via a bus 1b.
The CPU 11 is a processor that functions as a controller to control operation of the electronic timepiece 1 by reading and executing programs 131 stored in the storage 13 and performing various types of arithmetic processing. The electronic timepiece 1 may have a plurality of processors (e.g., CPUs). The processors may perform processes that are performed by the CPU 11 of this embodiment. In this case, the processors constitute the controller. The processors may be involved in a common (same) process(es) or independently perform different processes in parallel.
The RAM 12 provides the CPU 11 with a working memory space and stores temporary data.
The storage 13 is a non-transitory storage medium readable by the CPU 11 as a computer and stores the programs 131 and various data. The storage 13 has, for example, a nonvolatile memory, such as a flash memory. The programs 131 are stored in the storage 13 in the form of a computer-readable program code(s). Examples of the data stored in the storage 13 include notification setting data 132 and a notification condition table 133. Specific contents of the notification setting data 132 and the notification condition table 133 will be described later.
The display 14 displays various types of information in analog form using hands, a date indicator and/or the like (all not shown) in accordance with control signals transmitted from the CPU 11. Examples of the information that is displayed by the display 14 include the current date and time, a day of the week, an alarm time, an elapsed time of a timer, various types of information based on outputs of the sensor unit 18 (e.g., water pressure, surfacing speed underwater, heart rate, etc.), and an operation mode of the electronic timepiece 1. The display 14 includes a stepping motor and a wheel train mechanism. The operation of the stepping motor is controlled by the CPU 11, and the wheel train mechanism transmits driving force of the stepping motor to the hands, the date indicator and/or the like to rotate these.

The display 14 is not limited to an analog display, but may be a digital display that displays information in digital form using a liquid crystal panel and/or the like. The display 14 may have an analog part that displays information in analog form and a digital part that displays information in digital form.

The timekeeper 15 includes an oscillation circuit, a frequency dividing circuit and a timekeeping circuit. In the timekeeper 15, a clock signal generated by the oscillation circuit is divided by the frequency dividing circuit, and the signals into which the clock signal has been divided are counted by the timekeeping circuit, so that the current date and time is derived and kept.

The communicator 16 is a communication module including an antenna, a modulation/demodulation circuit and a signal processing circuit, and performs wireless data communications with external devices in accordance with a predetermined communication standard. The communicator 16 may include a component for communicating with external devices underwater, such as a module for acoustic communications or optical wireless communications.

The operation receiver 17 includes operation buttons 171 disposed on the lateral surface of the main body 101 or the like. The operation receiver 17 receives user operations on the operation buttons 171 and outputs operation signals corresponding to the user operations on the operation buttons 171 to the CPU 11. The operation receiver 17 may further include other components to be operated, such as a crown. The operation receiver 17 may have a touchscreen superimposed on the display screen of the display 14.

The sensor unit 18 includes a pressure sensor 181, a water detection sensor 182, a motion sensor 183 and a pulse wave sensor 184.

The pressure sensor 181 is a semiconductor pressure sensor utilizing a piezoresistive effect. The pressure sensor 181 outputs, underwater, a detection value corresponding to the magnitude of water pressure to the CPU 11. The CPU 11 derives a water depth on the basis of the detection value.

The water detection sensor 182 detects that the electronic timepiece 1 is wet with water and outputs the detection result to the CPU 11. The detection method of the water detection sensor 182 is not specifically limited, but may be a method of detecting decrease in electrical resistance due to water between conductors exposed to the outside of the electronic timepiece 1. If the operation receiver 17 has a capacitive touchscreen, the touchscreen may be used as the water detection sensor 182. That is, the electronic timepiece 1 being wet with water may be detected on the basis of change in capacitance due to the touchscreen being in contact with water.

The motion sensor 183 detects acceleration and/or angular velocity generated by movement of the electronic timepiece 1 and outputs the detection result to the CPU 11. The motion sensor 183 includes, for example, a three-axis sensor and a three-axis angular velocity sensor.

The pulse wave sensor 184 detects a pulse wave as biological data of the user. The pulse wave sensor 184 includes a light-emitting element that emits light from the back surface of the main body 101 (surface in contact with the wrist in the state in which the electronic timepiece 1 is worn) and a light-receiving element that receives the light emitted from the light-emitting element and reflected on the user's skin. The light-emitting element emits green light, which is easily absorbed by hemoglobin in blood, having a peak wavelength of 520 nm to 530 nm, for example. Since part of the light emitted to the skin is absorbed by the blood in blood vessels, the amount of the light received by the light-receiving element of the reflected light from the skin changes with time according to change in blood flow volume due to pulsation of the heart. The pulse wave sensor 184 detects the pulse wave on the basis of the change in the amount of the received light and outputs a waveform corresponding to the detected pulse wave to the CPU 11. The CPU 11 derives a heart rate (pulse rate) on the basis of the waveform.

The notifier 19 performs various types of notification for the user using the electronic timepiece 1. The notifier 19 includes a sound outputter 191, a vibrator 192 and a light emitter 193.

The sound outputter 191 includes, for example, a piezoelectric speaker or a piezoelectric buzzer each utilizing a piezoelectric element, and outputs notification sound (sound), such as beeps, in accordance with a control signal transmitted from the CPU 11. The sound outputter 191 may be capable of switching loudness of the notification sound to output between two or more levels, and also be capable of switching frequency (pitch of sound) between two or more levels.

The vibrator 192 vibrates under the control of the CPU 11. Vibrations made by the vibrator 192 are propagated to the main body 101 of the electronic timepiece 1. The user wearing the electronic timepiece 1 can recognize the vibrations propagated to the main body 101 at his/her wrist. The vibrator 192 includes, for example, a motor the operation of which is controlled by the CPU 11, a rotary shaft that is rotated by the motor, and a weight attached eccentrically to the rotary shaft, and functions as a vibration source by propagating vibrations generated by the rotation of the eccentric weight to the surroundings. The vibrator 192 is capable of changing vibration intensity between two or more levels (three levels in this embodiment) according to the rotation rate of the motor or the like. The vibrator 192 is capable of vibrating with any of two or more types (three types in this embodiment) of vibration pattern different from one another. Each vibration pattern is realized by changing operation/non-operation of the motor or the vibration intensity with a predetermined pattern.

The light emitter 193 includes a light-emitting element, such as a light-emitting diode (LED), and emits light in accordance with a control signal transmitted from the CPU 11. The light emitter 193 is capable of changing light intensity and blinking pattern (e.g., blinking frequency) in accordance with a control signal. The user can recognize notification by seeing light emitted from the light emitter 193. The light emitter 193 may be configured to emit light to illuminate the display surface of the display 14. In this case, the light emitter 193 may be a solar panel (solar cell) that is disposed in the display 14 and emits light according to a voltage applied. To be more specific, this solar panel has a diode structure in which a compound semiconductor material, such as InGaP, is interposed between electrodes, which are a pair of electrodes. During normal operation, the solar panel charges a battery by outputting an electric current according to electromotive force generated by receiving light. The solar panel can emit light by a forward voltage applied thereto by the solar panel and the battery electrically being connected to one another in the state in which the electromotive force of the battery is greater than the electromotive force of the solar panel. In the case where the compound semiconductor material is InGaP, red light (center wavelength of 664.5 nm) is emitted. The solar panel is disposed, for example, in the circular display 14 shown in FIG. 1 along its periphery to be ring-shaped, thereby being able to emit ring-shaped red light in the display 14.

The light emitter 193 may be disposed on the outer surface (e.g., lateral surface) of the main body 101 and emit light toward the outside of the main body 101. Disposing the light emitter 193 on the outer surface of the main body 101 makes it easy for the user wearing the electronic timepiece 1 to recognize the light emission, and also makes it easy for other users around him/her (e.g., divers diving with the user) to be aware of the light emission. A plurality of users therefore can support one another in what to do with respect to the notification.

Next, operation of the electronic timepiece 1 will be described, in particular, an underwater notification action by the notifier 19.

The electronic timepiece 1 of this embodiment has a plurality of notification functions different from one another. When any of execution conditions for the respective notification functions is satisfied, the notifier 19 performs notification pertaining to its corresponding notification function. The CPU 11 selects one notification setting from a plurality of notification settings stored in the notification setting data 132 in accordance with a predetermined algorithm and causes the notifier 19 to perform notification in a notification mode corresponding to the selected notification setting.

Figure 4:
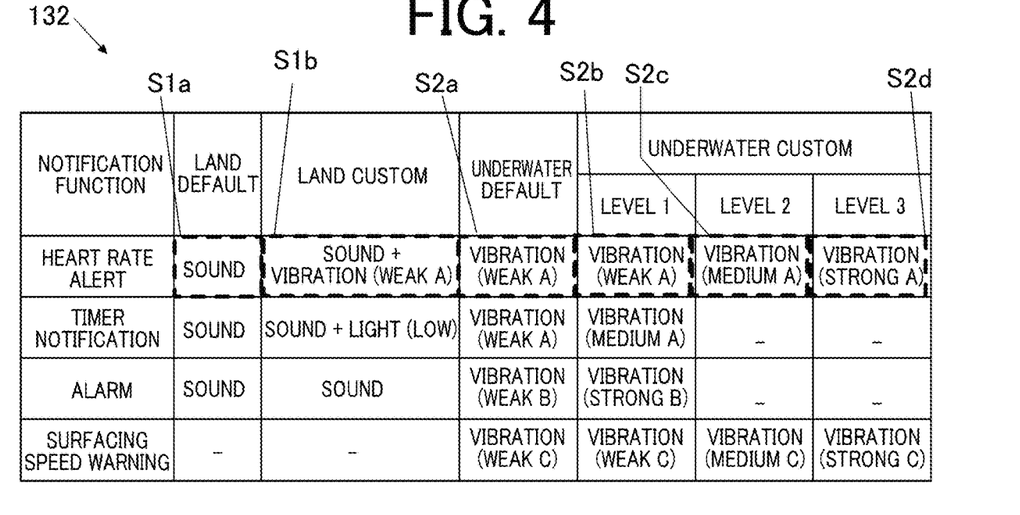
FIG. 4 shows contents of notification setting data.

FIG. 4 shows contents of the notification setting data 132.

In FIG. 4, "Heart Rate Alert", "Timer Notification", "Alarm" and "Surfacing Speed Warning" are shown as examples of the notification functions that the electronic timepiece 1 has.

The "Heart Rate Alert" is a function to perform notification when the following execution condition is satisfied: the heart rate r derived on the basis of the detection result of the pulse wave sensor 184 is equal to or greater than a predetermined lower limit (100 bpm in this embodiment).

The "Timer Notification" is a function to perform notification when the following execution condition is satisfied: in a timer mode, a set timer time has elapsed.

The "Alarm" is a function to perform notification when the following execution condition is satisfied: an alarm time set by the user has arrived.

The "Surfacing Speed Warning" is a function to perform notification when the following execution condition is satisfied: the surfacing speed s underwater derived on the basis of temporal change in the detection result of the pressure sensor 181 is equal to or greater than a predetermined lower limit (9 m/min in this embodiment). This is a notification function to prevent the surfacing speed from being too fast during diving, which is a cause of decompression sickness.

The notification pertaining to each notification function finishes when a notification end condition set for each notification function is satisfied. In this embodiment, the notification end condition for "Heart Rate Alert" is that the heart rate r is less than 100 bpm. The notification end conditions for "Timer Notification" and "Alarm" are that a predetermined time has elapsed since the start of the notification or that the user has made a notification end operation. The notification end condition for "Surfacing Speed Warning" is that the surfacing speed s is less than 9 m/min.

These four notification functions may be prioritized so that when execution conditions for two or more of the notification functions are satisfied, the notification function having the highest priority is executed.

One row in the notification setting data 132 corresponds to one notification function. The notification setting data 132 includes, for each notification function, a plurality of selectable notification settings. One frame (cell) in the notification setting data 132 shown in FIG. 4 corresponds to one notification setting. Each notification setting belongs to one of four notification setting categories "Land Default", "Land Custom", "Underwater Default" and "Underwater Custom".

The "Land Default" is a notification setting category containing notification settings that are selected by default when the electronic timepiece 1 is being used on land. The notification settings belonging to "Land Default" cannot be changed by the user. In this embodiment, for convenience, the "land" or "on land" indicates any use environment except underwater, and examples of such use environment includes, in addition to on land, on ocean/sea, on water, and in air.

The "Land Custom" is a notification setting category containing notification settings customized and registered by the user as notification settings for land use. The user can freely change the contents of each notification setting belonging to "Land Custom" by making a setting operation on a not-shown setting screen. If, for a notification function, a notification setting is registered in "Land Custom", this notification setting is preferentially selected, and a notification setting registered in "Land Default" is not selected.

For "Surfacing Speed Warning", no notification settings are registered in the notification setting categories "Land Default" and "Land Custom". This is because the execution condition for "Surfacing Speed Warning" is satisfied only when the electronic timepiece 1 is being used underwater.

The "Underwater Default" is a notification setting category containing notification settings that are selected by default when the electronic timepiece 1 is being used underwater. The notification settings belonging to "Underwater Default" cannot be changed by the user. In this embodiment, the "underwater" or "in water" indicates, in addition to the case where the electronic timepiece 1 is being used underwater continuously, such as during diving, a case where the electronic timepiece 1 is being used in a wet state by being in and out of water, such as during swimming.

The "Underwater Custom" is a notification setting category containing notification settings customized and registered by the user as notification settings for underwater use. The user can freely change the contents of each notification setting belonging to "Underwater Custom" by making a setting operation on the not-shown setting screen. If, for a notification function, a notification setting is registered in "Underwater Custom", this notification setting is preferentially selected, and a notification setting registered in "Underwater Default" is not selected.

Figure 5:
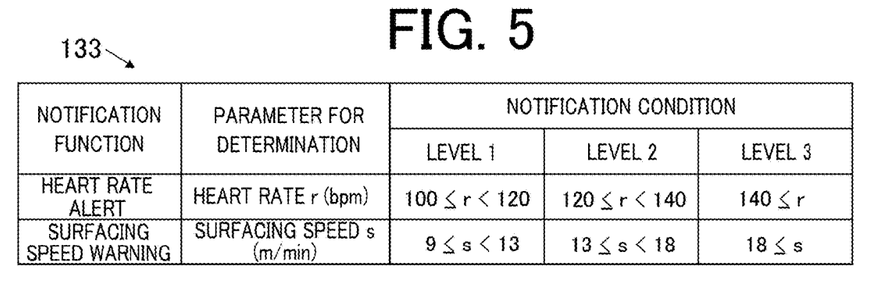
FIG. 5 shows contents of a notification condition table.

For the notification functions "Heart Rate Alert" and "Surfacing Speed Warning", notification settings of three levels (Level 1 to Level 3) are registered in the notification setting category "Underwater Custom". Three notification conditions are set to correspond to the three levels, and a notification setting of, among the three levels, a level the notification condition for which is satisfied is selected. Contents of the notification conditions are registered in the notification condition table 133.

FIG. 5 shows the contents of the notification condition table 133.

As shown in FIG. 5, regarding "Heart Rate Alert", the notification conditions are defined by the heart rate r (bpm). To be more specific, "100≤r<120" satisfies the notification condition for the level 1, which hereinafter may be referred to as "first notification condition", "120≤r<140" satisfies the notification condition for the level 2, which hereinafter may be referred to as "second notification condition", and "140≤r" satisfies the notification condition for the level 3, which hereinafter may be referred to as "third notification condition".

Regarding "Surfacing Speed Warning", the notification conditions are defined by the surfacing speed s (m/min). To be more specific, "9≤s<13" satisfies the notification condition for the level 1 (first notification condition), "13≤s<18" satisfies the notification condition for the level 2 (second notification condition), and "18≤s" satisfies the notification condition for the level 3 (third notification condition).

These notification conditions may be changed by the user making a predetermined operation(s). Further, the notification conditions for "Surfacing Speed Warning" may be changed automatically according to the depth of the electronic timepiece 1 underwater.

The notification settings in the notification setting data 132 shown in FIG. 4 indicate notification modes in which the notifier 19 operates to perform notification. The notification modes the of notifier 19 include notification modes each using one of the sound outputter 191, the vibrator 192 and the light emitter 193 and notification modes each using two or more of the sound outputter 191, the vibrator 192 and the light emitter 193 in combination. The "Sound" in the notification settings shown in FIG. 4 indicates that notification is performed by the sound outputter 191 outputting notification sound. The "Vibration" in the notification settings shown in FIG. 4 indicates that notification is performed by the vibrator 192 vibrating. The "Light" in the notification settings shown in FIG. 4 indicates that notification is performed by the light emitter 193 emitting light. In the case where two or more of these are used in combination, they are connected by "+", and shown, for example, as "Sound+Vibration" in FIG. 4.

For the notification by the vibrator 192 vibrating, a combination of the vibration intensity and the vibration pattern of the vibrator 192 is specified.

Figure 6:
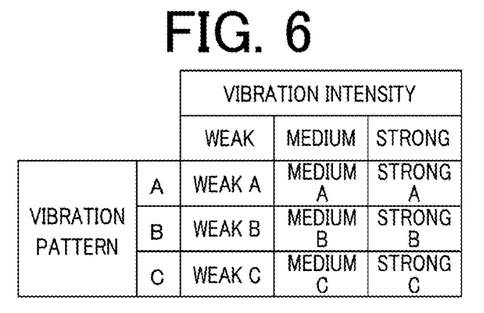
FIG. 6 shows combinations of vibration intensity and vibration pattern of a vibrator.

FIG. 6 shows combinations of the vibration intensity and the vibration pattern of the vibrator 192.

In this embodiment, nine combinations each consisting of one of three vibration intensities "Weak", "Medium" and "Strong" and one of three vibration patterns "A", "B" and "C" are used. Hereinafter these combinations pertaining to the vibration form may each be indicated, by using a reference sign of the vibration intensity and a reference sign of the vibration pattern, for example, "Vibration (Weak A)".

Figure 7:
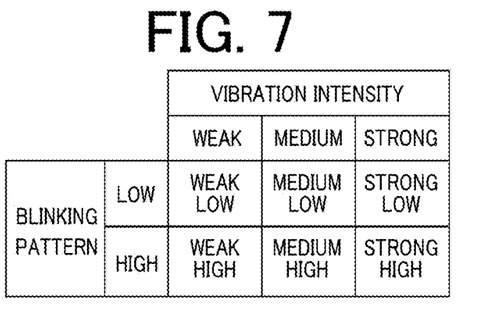
FIG. 7 shows combinations of light intensity and blinking pattern of a light emitter.

For the notification by the light emitter 193 emitting light, one of two patterns (blinking patterns) different from one another in blinking frequency of the light emitter 193 is used. Hereinafter a low-frequency pattern may be referred to as "Light (Low)", and a high-frequency pattern may be referred to as "Light (High)". For light emission of the light emitter 193, blinking patterns (light emission patterns) different from one another and light intensities different from one another may be combined.

FIG. 7 shows the combinations of the light intensity and the blinking pattern of the light emitter 193.

As shown in FIG. 7, six combinations each consisting of one of three light intensities "Weak", "Medium" and "Strong" and one of two blinking patterns having blinking frequencies "Low" and "High" may be used.

In this embodiment, the notification modes corresponding to the notification settings belonging to "Land Default" and "Land Custom" are each a notification mode in which the sound outputter 191 outputs notification sound, which hereinafter may be referred to as "first notification mode". Further, the notification modes corresponding to the notification settings belonging to "Underwater Default" and "Underwater Custom" are each a notification mode in which the sound outputter 191 outputs not notification sound but other, which hereinafter may be referred to as "second notification mode". The user may not be allowed to change the notification settings registered in "Underwater Custom" to notification settings to output notification sound. Hereinafter each notification setting indicating the first notification mode may be referred to as "first notification setting S1", and each notification setting indicating the second notification mode may be referred to as "second notification setting S2".

For example, regarding the notification function "Heart Rate Alert" in FIG. 4, a first notification setting S1a belonging to "Land Default" is "Sound", and a first notification setting S1b belonging to "Land Custom" is "Sound+Vibration (Weak A)". Therefore, when the execution condition for "Heart Rate Alert" is satisfied in the state in which the electronic timepiece 1 is being used on land, the first notification setting S1b belonging to "Land Custom" is selected, and notification is performed by the sound outputter 191 outputting notification sound and the vibrator 192 vibrating with "Vibration (Weak A)" in combination.

Further, a second notification setting S2a belonging to "Underwater Default" is "Vibration (Weak A)", and among the notification settings belonging to "Underwater Custom", a second notification setting S2b of "Level 1" is "Vibration (Weak A)", a second notification setting S2c of "Level 2" is "Vibration (Medium A)", and a second notification setting S2d of "Level 3" is "Vibration (Strong A)". Therefore, when the execution condition for "Heart Rate Alert" is satisfied (when the heart rate r≥100, i.e., when the first notification condition is satisfied) in the state in which the electronic timepiece 1 is being used underwater, first, the second notification setting "Level 1" of "Underwater Custom" is selected, and notification is performed by the vibrator 192 vibrating with "Vibration (Weak A)". Thereafter, when the heart rate r reaches 120 or greater and the second notification condition is satisfied accordingly, the second notification setting S2c of "Level 2" is selected, and notification is performed by the vibrator 192 vibrating with "Vibration (Medium A)". Further, when the heart rate r reaches 140 or greater and the third notification condition is satisfied accordingly, the second notification setting S2d of "Level 3" is selected, and notification is performed by the vibrator 192 vibrating with "Vibration (Strong A)". Thus, the greater the heart rate r, the greater the vibration intensity to perform notification. Similarly, regarding "Surfacing Speed Warning", the higher the surfacing speed s, the greater the vibration intensity to perform notification.

In the notification setting data 132 shown in FIG. 4, the notification settings belonging to the notification setting category "Underwater Custom" are all for vibrations only, but different in combination of the vibration intensity and the vibration pattern. Therefore, the user can determine, from the combination, for which level of which notification function the notification being performed is. This notification setting data 132 is used, for example, by a veteran diver who can determine the content of the notification from the combination of the vibration pattern and the vibration intensity.

Thus, for example, regarding "Heart Rate Alert", the CPU 11 sets one of a plurality of notification modes (e.g., six notification modes corresponding to the notification settings S1a, S1b, S2a to S2d), the plurality of notification modes including the first notification mode(s) and the second notification mode(s), as a notification mode of the notifier 19, and causes the notifier 19 to perform notification in the set notification mode. Further, the CPU 11 determines, on the basis of an output from the sensor unit 18, whether the electronic timepiece 1 is being used underwater, and if the CPU 11 determines that the electronic timepiece 1 is being used underwater, sets the second notification mode (one of the notification modes corresponding to the notification settings S2a to S2d) as the notification mode of the notifier 19. In addition, if the CPU 11 determines that the electronic timepiece 1 is being used underwater, the CPU 11 determines whether each of a plurality of notification conditions is satisfied, and changes the vibration intensity and/or the vibration pattern of the notification by vibrating in accordance with a satisfied notification condition among the plurality of notification conditions.

Figure 8:
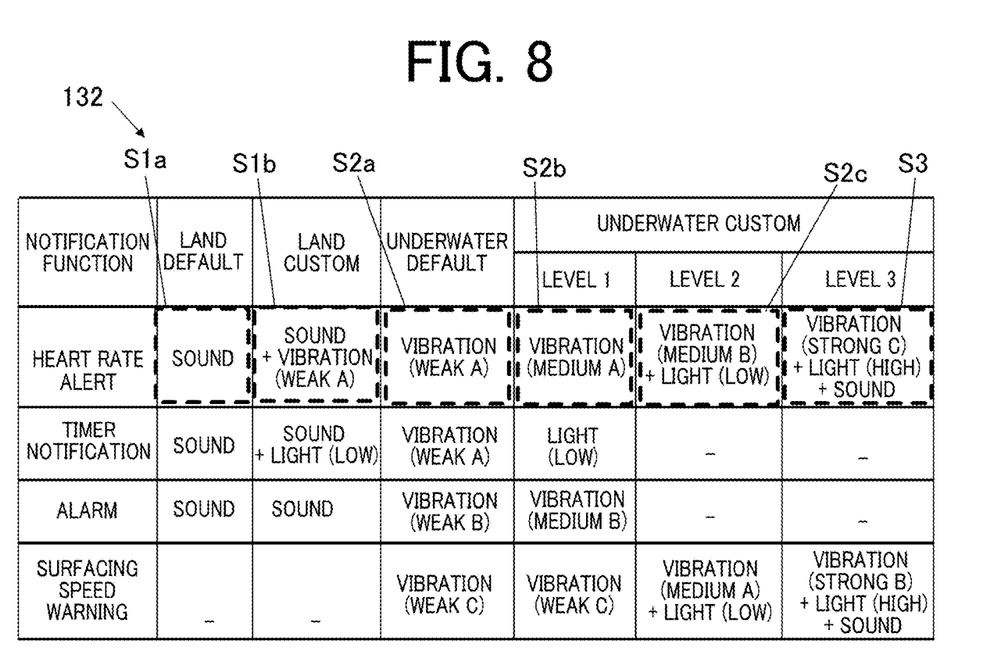
FIG. 8 shows another example of the notification setting data.

FIG. 8 shows another example of the notification setting data 132.

The notification setting data 132 shown in FIG. 8 is different from that shown in FIG. 4 in contents of the notification settings belonging to the notification setting category "Underwater Custom". For example, in the notification setting data 132 shown in FIG. 8, the second notification setting S2c of "Level 2" is a notification setting to cause the light emitter 193 to emitting low-frequency light in addition to the vibrator 192 to vibrate. That is, in the second notification mode, when the first notification condition among the plurality of notification conditions is satisfied, the notifier 19 performs notification by vibrating with "Level 1", and when the second notification condition, which is different from the first notification condition, among the plurality of notification conditions is satisfied, the notifier 19 performs notification by vibrating and emitting light.

Further, in the notification setting of "Level 3", output of notification sound by the sound outputter 191 is further added. The notification setting that is the second notification setting S2c with output of notification sound added is referred to as "third notification setting S3". The notification mode indicated by the third notification setting S3 is referred to as "third notification mode". Further, the third notification condition for "Level 3" in this case is referred to as a notification enhancement condition. That is, if the CPU 11 determines that the third notification condition as the notification enhancement condition is satisfied during notification in the second notification mode, which is performed when the second notification setting S2 is selected, the notification mode of the notifier 19 switches to the third notification mode, which includes output of notification sound.

Thus, in the notification setting data 132 shown in FIG. 8, some of the notification settings belonging to "Underwater Custom" are notification settings to emit light and/or output notification sound as well as to vibrate. This makes it easy for the user to be aware of notification. Further, the notification settings belonging to "Underwater Custom" are different from one another in combination of vibrating, emission of light and output of notification sound or in output form thereof (vibration intensity, vibration pattern or blinking frequency). This allows the user to judge, from the combination or the output form, for which level of which notification function the notification being performed is.

This notification setting data 132 is used, for example, by a novice diver who is less experienced and accordingly less likely to be aware of notification.

In FIG. 8, the second notification setting S2 belonging to "Underwater Custom" for "Timer Notification" is "Light (Low)" only. Thus, in the second notification mode(s) corresponding to the second notification setting(s) S2, it is not always necessary that the vibrator 192 vibrates, as far as the sound outputter 191 does not output notification sound.

Next, a notification setting process and a notification process that are performed by the CPU 11 of the electronic timepiece 1 to realize the above-described notification action will be described.

Figure 9:
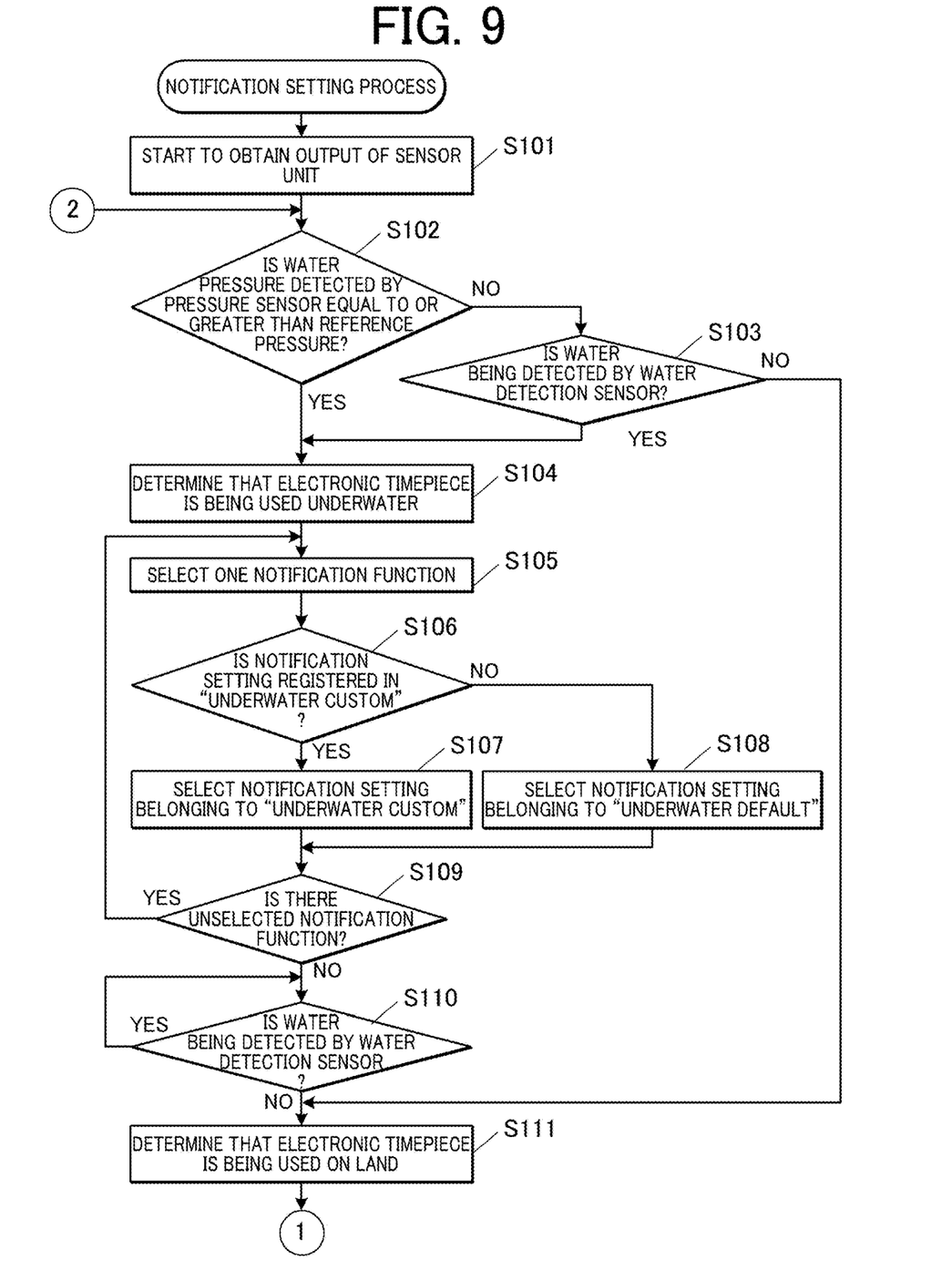
FIG. 9 is a flowchart showing a control procedure of a notification setting process.
Figure 10:
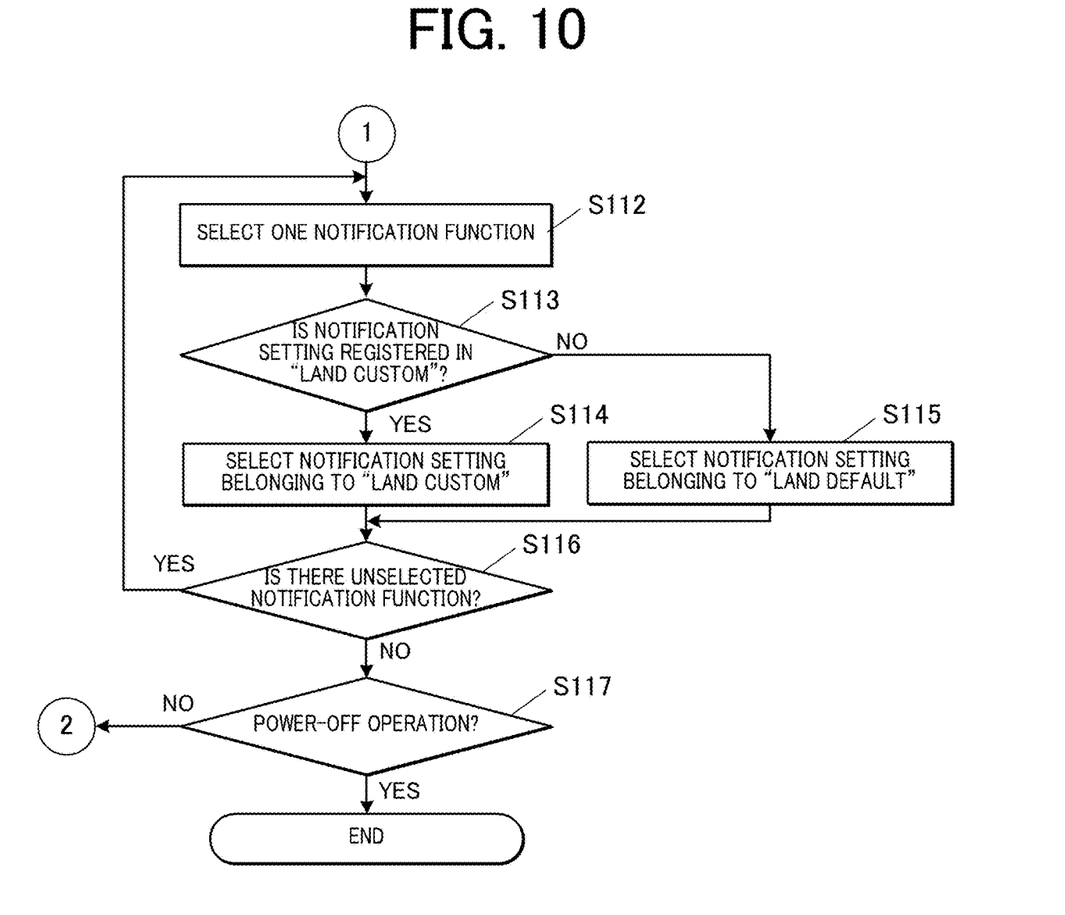
FIG. 10 is a continuation of the flowchart of FIG. 9.

FIG. 9 and FIG. 10 are a flowchart showing a control procedure of the notification setting process.

The notification setting process is a process to determine whether the electronic timepiece 1 is being used underwater or on land and select a notification setting corresponding to each notification function in accordance with the determination result. The notification setting process is started, for example, when the electronic timepiece 1 is powered on.

Once the notification setting process is started, the CPU 11 starts to keep obtaining outputs of the sensor unit 18 (Step S101). The CPU 11 determines whether the water pressure (pressure) detected by the pressure sensor 181 is equal to or greater than a reference pressure (Step S2). If the CPU 11 determines that the detected water pressure is equal to or greater than the reference pressure (Step S102; YES), the CPU 11 determines that the electronic timepiece 1 is being used underwater (Step S104). The reference pressure can be set as appropriate as a water pressure corresponding to a predetermined water depth. For example, a water pressure corresponding to a water depth of 1.5 m may be set as the reference pressure.

If the CPU 11 determines that the detected water pressure is less than the reference pressure (Step S102; NO), the CPU 11 determines whether water is being detected by the water detection sensor 182 (Step S103). If the CPU 11 determines that water is being detected (Step S103; YES), the CPU 11 determines that the electronic timepiece 1 is being used underwater (Step S104).

Alternatively, the following is possible: if the CPU 11 determines that the detected water pressure is equal to or greater than the reference pressure (Step S102; YES) and also determines that water is being detected by the water detection sensor 182 (Step S103; YES), the CPU 11 then proceeds to Step S104 to determine that the electronic timepiece 1 is being used underwater. This can reduce the possibility of false detection about whether the electronic timepiece 1 is being used underwater.

In order to exclude cases such as a case where water is merely got on the electronic timepiece 1, the following is possible: if the CPU 11 determines that water is being detected by the water detection sensor 182 and also determines that the pressure detected by the pressure sensor 181 is fluctuating at or over a predetermined fluctuation width, the CPU 11 then determines "YES" in Step S103. The predetermined fluctuation width may be set as large as possible below the range of pressure fluctuation widths that could occur by the electronic timepiece 1 being in and out of water, for example, during swimming.

Alternatively, the following is possible: if the CPU 11 determines that water is being detected by the water detection sensor 182 and also determines that the amount of change in acceleration or angular velocity detected by the motion sensor 183 is within a predetermined range, the CPU 11 determines "YES" in Step S103. The predetermined range may be set to contain the amount of change in acceleration or angular velocity during swimming, for example.

After Step S104, the CPU 11 selects one of the notification functions included in the notification setting data 132 (Step S105) and determines whether a notification setting is registered in "Underwater Custom" for the notification function (Step S106). If the CPU 11 determines that a notification setting is registered in "Underwater Custom" for the notification function (Step S106; YES), the CPU 11 selects the notification setting belonging to "Underwater Custom" for the notification function, which is currently selected, and stores the selection result in the RAM 12 or the storage 13 (Step S107). If notification settings of multiple levels are registered in "Underwater Custom" for the notification function, in Step S107, the CPU 11 selects the notification setting of "Level 1". If the CPU 11 determines that no notification setting is registered in "Underwater Custom" (Step S106; NO), the CPU 11 selects the notification setting belonging to "Underwater Default" for the notification function, which is currently selected, and stores the selection result in the RAM 12 or the storage 13 (Step S108). After Step S107 or Step S108, if the CPU 11 determines that there is an unselected notification function(s) (Step S109; YES), the CPU 11 returns to Step S105 to select a notification setting for the next notification function.

If the CPU 11 determines that there is no unselected notification function (Step S109; NO), the CPU 11 repeatedly determines whether water is being detected by the water detection sensor 182 (Step S110). If the CPU 11 determines that water is not being detected by the water detection sensor 182 (Step S110; NO), the CPU 11 determines that the electronic timepiece 1 is being used on land (Step S111). The contents of the process in Step S110 are not limited thereto. For example, the CPU 11 may determine whether the pressure detected by the pressure sensor 181 is stable and less than the reference pressure, and determine that the electronic timepiece 1 is being used on land if the CPU 11 determines that the pressure detected by the pressure sensor 181 is stable and less than the reference pressure.

The CPU 11 selects one of the notification functions included in the notification setting data 132 (Step S112 shown in FIG. 10) and determines whether a notification setting is registered in "Land Custom" for the notification function (Step S113). If the CPU 11 determines that a notification setting is registered in "Land Custom" for the notification function (Step S113; YES), the CPU 11 selects the notification setting belonging to "Land Custom" for the notification function, which is currently selected, and stores the selection result in the RAM 12 or the storage 13 (Step S114). If the CPU 11 determines that no notification setting is registered in "Land Custom" for the notification function (Step S113; NO), the CPU 11 selects the notification setting belonging to "Land Default" for the notification function, which is currently selected, and stores the selection result in the RAM 12 or the storage 13 (Step S115). After Step S114 or Step S115, if the CPU 11 determines that there is an unselected notification function(s) (Step S116; YES), the CPU 11 returns to Step S112 to select a notification setting for the next notification function.

If the CPU 11 determines that there is no unselected notification function (Step S116; NO), the CPU 11 determines whether an operation to power off the electronic timepiece 1 has been made (Step S117). If the CPU 11 determines that the operation to power off the electronic timepiece 1 has not been made (Step S117; NO), the CPU 11 returns to Step S102. If the CPU 11 determines that the operation to power off the electronic timepiece 1 has been made (Step S117; YES), the CPU 11 ends the notification setting process.

Figure 11:
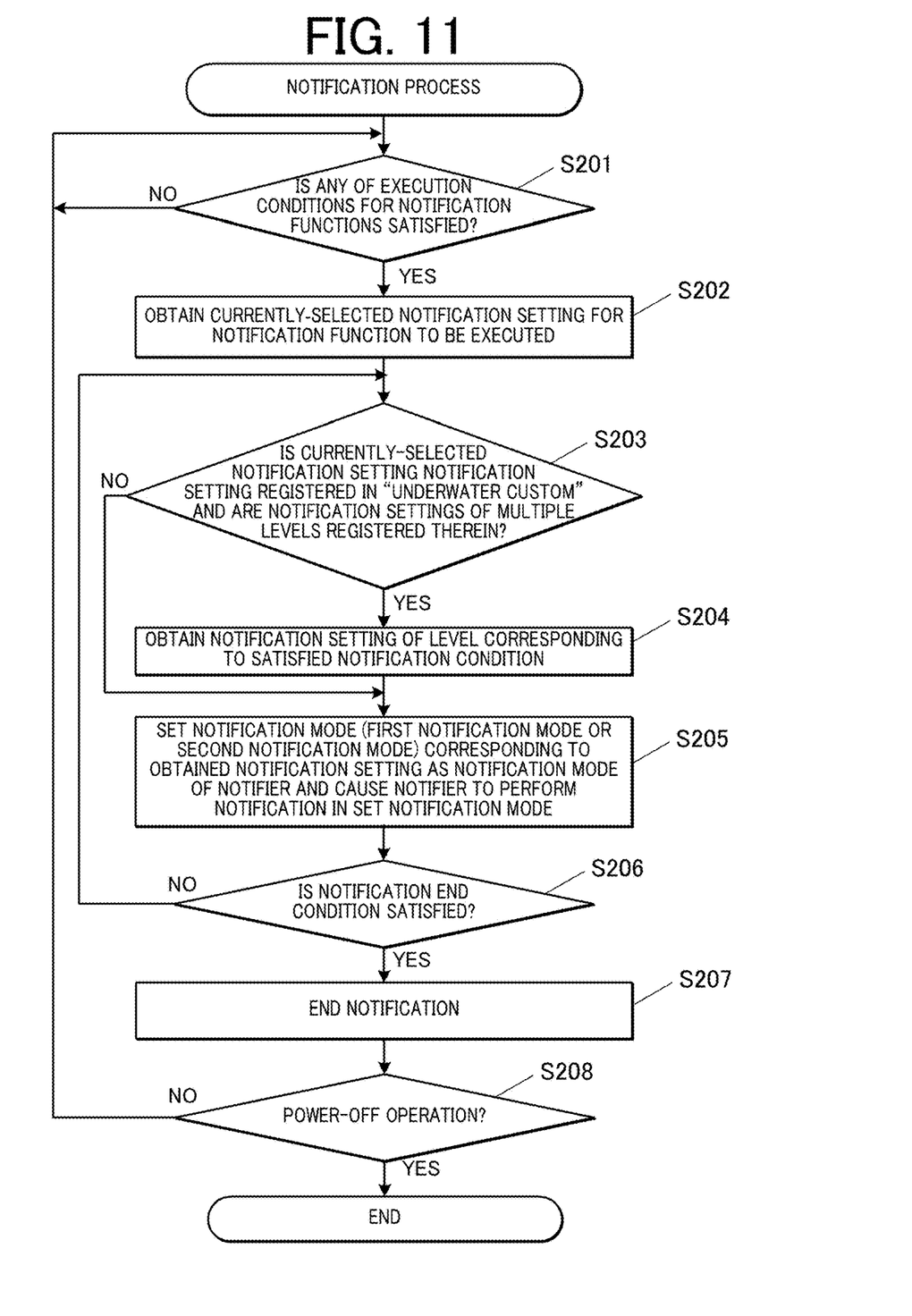
FIG. 11 is a flowchart showing a control procedure of a notification process.

FIG. 11 flowchart showing a control procedure of the notification process.

The notification process is a process to perform notification pertaining to each notification function of the electronic timepiece 1. The notification process is started, for example, when the electronic timepiece 1 is powered on.

When the notification process is started, the CPU 11 repeatedly determines whether any of the execution conditions for the respective notification functions is satisfied (Step S201). For example, the CPU 11 determines that the execution condition for "Heart Rate Alert" is satisfied when the heart rate derived on the basis of the detection result of the pulse wave sensor 184 is equal to or greater than a predetermined lower limit. As another example, the CPU 11 determines that the execution condition for "Timer Notification" is satisfied when in the timer mode, a set timer time has elapsed. As another example, the CPU 11 determines that the execution condition for "Alarm" is satisfied when an alarm time set by the user has arrived. As another example, the CPU 11 determines that the execution condition for "Surfacing Speed Warning" is satisfied when the surfacing speed underwater derived on the basis of temporal change in the detection result of the pressure sensor 181 is equal to or greater than a predetermined lower limit. If the CPU 11 determines that any of the execution conditions for the respective notification functions is satisfied (Step S201; YES), the CPU 11 obtains the notification setting that is currently selected for the notification function to be executed (Step S202).

The CPU 11 determines whether the following condition is satisfied: the obtained currently-selected notification setting is a notification setting registered in "Underwater Custom" and notification settings of multiple levels are registered in "Underwater Custom" for the notification function to be executed (Step S203). If the CPU 11 determines that the condition is satisfied (Step S203; YES), the CPU 11 determines whether each of the notification conditions for the level 1 to the level 3 is satisfied, and obtains, among the notification settings: registered in "Underwater Custom", the notification setting of the level corresponding to the satisfied notification condition (Step S204).

After Step S204 or "NO" in Step S203, the CPU 11 sets a notification mode (first notification mode or second notification mode) corresponding to the obtained notification setting as the notification mode of the notifier 19 and causes the notifier 19 to perform notification in the set notification mode (Step S205). For example, if the obtained notification setting is the first notification setting S1b shown in FIG. 4, the CPU 11 causes the sound outputter 191 to output notification sound and also causes the vibrator 192 to vibrate with the vibration form "Vibration (Weak A)". As another example, if the obtained notification setting is the second notification setting S2d shown in FIG. 4, the CPU 11 causes the vibrator 192 to vibrate with the vibration form "Vibration (Strong A)".

The CPU 11 determines whether the notification end condition for the notification function, which is currently executed, is satisfied (Step S206). For example, when the heart rate is below the predetermined lower limit, the CPU 11 determines that the notification end condition for "Heart Rate Alert" is satisfied (Step S206; YES). As another example, when the predetermined time has elapsed since the start of the notification, the CPU 11 determines that the notification end condition for "Timer Notification" or "Alarm" is satisfied (Step S206; YES). As another example, when the surfacing speed is below the predetermined lower limit, the CPU 11 determines that the notification end condition for "Surfacing Speed Warning" is satisfied (Step S206; YES). If the CPU 11 determines that the notification end condition for the notification function, which is currently executed, is not satisfied (Step S206; NO), the CPU returns to Step S203. During repetition of the loop of Step S203 to Step S206, if the satisfied notification condition changes to another, the level (level 1, level 2 or level 3) of the notification is changed accordingly.

In Step S206, if the CPU 11 determines that the notification end condition is satisfied (Step S206; YES), the CPU 11 causes the notifier 19 to end the notification (Step S207) and determines whether an operation to power off the electronic timepiece 1 has been made (Step 208). If the CPU 11 determines that the operation to power off the electronic timepiece 1 has not been made (Step S208; NO), the CPU 11 returns to Step S201. If the CPU 11 determines that the operation to power off the electronic timepiece 1 has been made (Step S208; YES), the CPU 11 ends the notification process.

Second Embodiment

Next, a second embodiment will be described. The second embodiment is the same as the first embodiment except for some contents of the notification setting process. Hereinafter different points from the first embodiment will be described.

The CPU 11 of the electronic timepiece 1 of this embodiment switches the operation mode of the electronic timepiece 1 between a first operation mode and a second operation mode in accordance with a user operation. The first operation mode is for land (other than underwater) use, and the second operation mode is for underwater use. There may be multiple types of the first operation mode different from one another and multiple types of the second operation mode different from one another. The user switches the operation mode to the second operation mode before starting an underwater activity, such as swimming, thereby causing the electronic timepiece 1 to appropriately operate for the underwater activity. For example, when the operation mode is switched from the first operation mode to the second operation mode, detection of water pressure by the pressure sensor 181 and detection of water by the water detection sensor 182 are started, and also the surfacing speed warning is activated. On the other hand, when the operation mode is switched from the second operation mode to the first operation mode, detection of water pressure by the pressure sensor 181 and detection of water by the water detection sensor 182 are stopped, and also the surfacing speed warning is deactivated.

Figure 12:
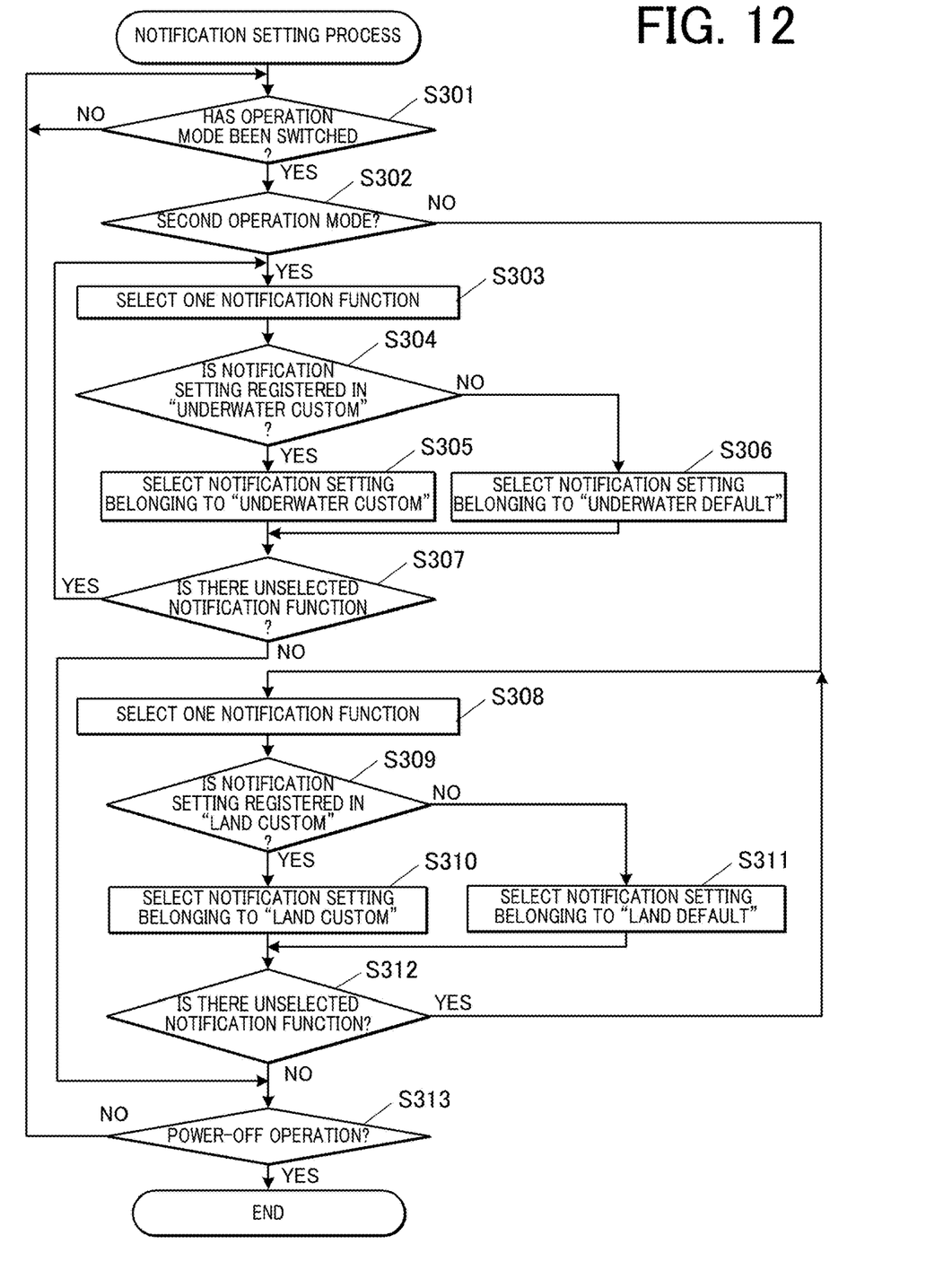
FIG. 12 is a flowchart showing a control procedure of the notification setting process in a second embodiment.

In this embodiment, selection of a notification setting and setting of a notification mode as the notification mode of the notifier 19 accordingly are performed in accordance with switching of the operation mode. FIG. 12 is a flowchart showing a control procedure of the notification setting process in the second embodiment.

When the notification setting process is started, the CPU 11 repeatedly determines whether the operation mode has been switched by a user operation (Step S301). In the notification setting process that is performed first time after power-on of the electronic timepiece 1, Step S301 may be omitted, and in accordance with the operation mode at the time of power-on, the CPU 11 may select a notification setting by performing processes in and after Step S302.

If the CPU 11 determines that the operation mode has been switched by a user operation (Step S301; YES), the CPU 11 determines whether the after-switched operation mode is the second operation mode (Step S302). If the CPU 11 determines that the after-switched operation mode is the second operation mode (Step S302; YES), the CPU 11 performs processes in Step S303 to Step S307 to select a notification setting for underwater use. The processes in Step S303 to Step S307 are the same as those in Step S105 to Step S109 of the notification setting process in the first embodiment (shown in FIG. 9), and therefore their descriptions will be omitted.

If the CPU 11 determines that the after-switched operation mode is not the second operation mode (Step S302; NO), the CPU 11 performs processes in Step S308 to Step S312 to select a notification setting for land use. The processes in Step S308 to Step S312 are the same as those in Step S112 to Step S116 of the notification setting process in the first embodiment (shown in FIG. 10), and therefore their descriptions will be omitted.

In Step S307 or Step S312, if the CPU 11 determine that there is no unselected notification function (Step S307 or Step S312; NO) and determines that the operation to power off the electronic timepiece 1 has not been made (Step S313; NO), the CPU 11 returns to Step S301. If the CPU 11 determines that the operation to power off the electronic timepiece 1 has been made (Step S313; YES), the CPU 11 ends the notification setting process.

It is difficult, underwater, to determine where sound is generated because the propagation speed of sound is faster underwater than in air. Therefore, if notification sound is output from an electronic device of a user in the situation where two or more users wearing their electronic devices are in water, the other users may wrongly recognize the notification sound as notification sound output from their electronic devices.

To deal with this, the electronic timepiece 1 of the first embodiment includes the notifier 19 and the CPU 11. The notifier 19 is capable of performing notification in a plurality of notification modes including the first notification mode in which the notifier 19 outputs notification sound and the second notification mode in which the notifier 19 outputs not notification sound but other. The CPU 11 determines whether the electronic timepiece 1 is being used underwater, and in response to determining that the electronic timepiece 1 is being used underwater, switches the notification mode of the notifier 19 from the first notification mode to the second notification mode in the case where the first notification mode is set as the notification mode of the notifier 19. Thus, the electronic timepiece 1 can perform notification in the second notification mode, which does not involve output of notification sound, while being used underwater. This can reduce occurrence of the problem that in the situation where a plurality of users is in water, the user of the electronic timepiece 1 wrongly recognizes notification sound output from another user's electronic device as notification sound output from his/her own electronic timepiece 1, or wrongly recognizes notification sound output from his/her own electronic timepiece 1 as notification sound from another user's electronic device. Further, selecting an appropriate notification mode for the environment where the user is present makes it easier for the user to recognize notification. This can reduce user's stress in using the electronic timepiece 1.

Further, the CPU 11 determines based on an output(s) from the sensor unit 18 whether the electronic timepiece 1 is being used underwater. This can accurately determine whether the electronic timepiece 1 is being used underwater.

Further, the electronic timepiece 1 of the second embodiment includes the notifier 19 and the CPU 11. The operation mode of the electronic timepiece 1 is switchable between the first operation mode for not underwater use and the second operation mode for underwater use. The notifier 19 is capable of performing notification in a plurality of notification modes including the first notification mode in which the notifier 19 outputs notification sound and the second notification mode in which the notifier 19 outputs not notification sound but other. In response to the operation mode being the second operation mode, the CPU 11 causes the notifier 19 to perform notification in the second notification mode. This can reduce occurrence of the aforementioned problem, recognition of namely, wrong notification underwater, as in the first embodiment.

Further, the CPU 11 switches the operation mode of the electronic timepiece 1 between the first operation mode and the second operation mode based on a user operation. In conjunction with switching of the operation mode by a user operation, the notification mode is changed. Hence, the notification mode can be switched reliably at user's intended timing.

Further, the CPU 11 causes the notifier 19 to perform notification by the vibrator 192 vibrating in the second notification mode. Vibrations of the electronic timepiece 1 can be perceived by the user regardless of the underwater environment. Hence, the electronic timepiece 1 can perform notification such that the user can easily recognize the notification, without using notification sound.

Further, the CPU 11 determines whether each of a plurality of notification conditions different from one another is satisfied, and changes the vibration intensity and/or the vibration pattern of notification by the vibrator 192 vibrating in accordance with a satisfied notification condition among the plurality of notification conditions. Thus, the electronic timepiece 1 can perform notification with one of a plurality of forms different from one another depending on the situation. For example, a form with which notification is performed can be adjusted/changed to another such that the higher the danger level of the situation, the easier it is for the user to recognize notification.

Further, the CPU 11 causes the notifier 19 to perform notification further by the light emitter 193 emitting light in the second notification mode. This can make the user recognize notification more reliably.

Further, the CPU 11 determines whether each of a plurality of notification conditions different from one another is satisfied, and changes the light intensity and/or the blinking pattern of notification by the light emitter 193 emitting light in accordance with a satisfied notification condition among the plurality of notification conditions. Thus, the electronic timepiece 1 can perform notification with one of a plurality of forms different from one another depending on the situation.

Further, the CPU 11 determines whether each of a plurality of notification conditions from one another is satisfied, in response to determining that the first notification condition among the plurality of notification conditions is satisfied, causes the notifier 19 to perform notification by the vibrator 192 vibrating in the second notification mode, and in response to determining that the second notification condition among the plurality of notification conditions is satisfied, the second notification condition being different from the first notification condition, causes the notifier 19 to perform notification by the vibrator 192 vibrating and the light emitter 193 emitting light in the second notification mode. Thus, the electronic timepiece 1 can perform notification with one of a plurality of forms different from one another depending on the situation. For example, in the situation where the danger level is high, light is emitted to make it easy for the user to recognize notification.

Further, the CPU 11 determines, in the case where the second notification mode is set as the notification mode of the notifier 19, whether the notification enhancement condition is satisfied, and in response to determining that the notification enhancement condition is satisfied, switches the notification mode of the notifier 19 from the second notification mode to the third notification mode that is the second notification mode with the sound outputter 191 outputting sound added. This can make the user recognize notification even more reliably.

Further, the electronic timepiece 1 includes the sensor unit 18. The sensor unit 18 includes the pressure sensor 181 that detects water pressure and/or the water detection sensor 182 that detects contact of the electronic timepiece 1 with water. Thus, the electronic device 1 can determine for sure whether it is actually being used underwater.

Further, the notification method of the first embodiment is performed by the CPU 11 of the electronic timepiece 1 including the notifier 19 that is capable of performing notification in a plurality of notification modes including the first notification mode in which the notifier 19 outputs notification sound and the second notification mode in which the notifier 19 outputs not notification sound but other. The notification method includes determining whether the electronic timepiece 1 is being used underwater, and in response to determining that the electronic timepiece 1 is being used underwater, switching the notification mode of the notifier 19 from the first notification mode to the second notification mode in the case where the first notification mode is set as the notification mode of the notifier 19. This can reduce wrong recognition of notification underwater.

Further, the notification method of the second embodiment is performed by the CPU 11 of the electronic timepiece 1 including the notifier 19 that is capable of performing notification in a plurality of notification modes including the first notification mode in which the notifier 19 outputs notification sound and the second notification mode in which the notifier 19 outputs not notification sound but other. The operation mode of the electronic timepiece 1 is switchable between the first operation mode for not underwater use and the second operation mode for underwater use. The notification method includes, in response to the operation mode being the second operation mode, causing the notifier 19 to perform notification in the second notification mode. This can reduce wrong recognition of notification underwater.

Further, the program(s) 131 stored in the storage section 13 as the storage medium of the first embodiment causes, of the electronic timepiece 1 including the notifier 19 that is capable of performing notification in a plurality of notification modes including the first notification mode in which the notifier 19 outputs notification sound and the second notification mode in which the notifier 19 outputs not notification sound but other, the CPU 11 to determine whether the electronic timepiece 1 is being used underwater, and in response to determining that the electronic timepiece 1 is being used underwater, switch the notification mode of the notifier 19 from the first notification mode to the second notification mode in the case where the first notification mode is set as the notification mode of the notifier 19. This can reduce wrong recognition of notification underwater.

Further, the program(s) 131 stored in the storage section 13 as the storage medium of the second embodiment causes, of the electronic timepiece 1 the operation mode of which is switchable between the first operation mode for not underwater use and the second operation mode for underwater use and that includes the notifier 19 that is capable of performing notification in a plurality of notification modes including the first notification mode in which the notifier 19 outputs notification sound and the second notification mode in which the notifier 19 outputs not notification sound but other, the CPU 11 to, in response to the operation mode being the second operation mode, cause the notifier 19 to perform notification in the second notification mode. This can reduce wrong recognition of notification underwater.

Others

The present disclosure is not limited to the above embodiments and can be modified in a variety of respects.

For example, in the above embodiments, the electronic device is the electronic timepiece 1, but not limited thereto. The electronic device may be any device that is used underwater, such as a dive computer.

Further, the configuration of the notifier 19 is not limited to that described in the above embodiments, as far as the notifier 19 has a component for performing notification with notification sound and a component for performing notification with vibrations. For example, the notifier 19 may have a component for performing notification with a method other than outputting notification sound, vibrating or emitting light.

Further, in the first embodiment, the method for determining whether the electronic timepiece 1 is being used underwater is the method of determining the same on the basis of an output of the pressure sensor 181 and an output of the water detection sensor 182 included in the electronic timepiece 1, but not limited thereto.

For example, it may be determined on the basis of an output of either the pressure sensor 181 or the water detection sensor 182. In this case, the sensor not used may not be provided.

Alternatively, it may be determined on the basis of an output of a sensor disposed outside the electronic timepiece 1. For example, while the user is diving with an external device worn together with the electronic timepiece 1, the electronic timepiece 1 may determine whether it is being used underwater by receiving an output of a sensor (e.g., pressure sensor or water detection sensor) disposed in/on the external device. Data transmission/reception underwater between the electronic timepiece 1 and the external device can be performed, for example, by wired communications, acoustic communications or optical communications.

Further, in the notification setting data 132 shown in FIG. 4 and FIG. 8, the notification settings belonging to "Underwater Default" are the second notification settings not to output notification sound, but may be the first notification settings to output notification sound. In this case, it is desired that the user be informed in advance by a manual or the like that if the notification setting registered in "Underwater Default" is selected, notification sound is output.

Further, "Land Custom" and "Underwater Custom" may be omitted, and a notification setting may be selected from those belonging to the notification setting categories "Land Default" and "Underwater Default".

Further, in the first embodiment, the first notification mode and the second notification mode may be switched depending on whether an external device used by another user (e.g., electronic timepiece worn by another diver who is diving with the user) is around the electronic timepiece 1. That is, in the situation where the CPU 11 has determined that the electronic timepiece 1 is being used underwater, if the CPU 11 determines that no external device is around the electronic timepiece 1, the CPU 11 may set the first notification mode as the notification mode of the notifier 19, whereas if the CPU 11 determines that an external device is around the electronic timepiece 1, the CPU 11 may set the second notification mode as the notification mode of the notifier 19. Whether or not an external device is around the electronic timepiece 1 can be determined, for example, on the basis of whether or not a signal has been received from an external device in response to a predetermined beacon signal having been transmitted by acoustic communications, optical communications or the like. Thus, notification sound is not output in the situation where notification by outputting notification sound may cause wrong recognition underwater. This can suppress occurrence of wrong recognition of notification. Meanwhile, notification sound may be output in the situation where no electronic device is around the electronic timepiece 1 and notification by outputting notification sound does not cause wrong recognition underwater accordingly.

This modification may be applied to the second embodiment. That is, in the situation where the electronic timepiece 1 is operating in the second operation mode, the CPU 11 may set the first notification mode as the notification mode of the notifier 19 if the CPU 11 determines that no external device is around the electronic timepiece 1, whereas the CPU 11 may set the second notification mode as the notification mode of the notifier 19 if the CPU 11 determines that an external device is around the electronic timepiece 1.

Further, in the above embodiments, the computer-readable storage medium storing the program(s) of the present disclosure is the flash memory of the storage 13, but not limited thereto. The computer-readable storage medium may be an information recording medium, such as a hard disk drive (HDD), a solid state drive (SSD) or a CD-ROM. Further, as a medium for providing data of the program(s) of the present disclosure via a communication line, a carrier wave is applicable.

It is a matter of course that the detailed configuration and operation of each component of the electronic timepiece 1 in the above embodiments can be appropriately modified without departing from the scope of the present disclosure.

Although some embodiments of the present disclosure have been described above, the scope of the present disclosure is not limited to the above embodiments, but includes the scope of claims and the scope of their equivalents.

The invention claimed is:

1. An electronic device comprising:
a notifier that is capable of performing notification pertaining to notification functions in a plurality of notification modes including a first notification mode in which the notifier outputs sound and a second notification mode in which the notifier outputs not sound but other; and
a processor,
wherein notification priorities are set for the respective notification functions,
wherein notification settings different from one another in notification intensity and/or notification pattern are set for the respective notification functions in the second notification mode, and
wherein the processor
determines whether the electronic device is being used underwater,
determines whether any of execution conditions for the respective notification functions is satisfied, and in response to determining that the electronic device is being used underwater and determining that execution conditions for, among the notification functions, two or more notification functions are satisfied, causes the notifier to perform the notification pertaining to, among the notification functions whose execution conditions are satisfied, a notification function having a highest notification priority in the second notification mode.

2. The electronic device according to claim 1, wherein the processor determines based on an output from a sensor whether the electronic device is being used underwater.

3. The electronic device according to claim 2, further comprising the sensor including at least one of a pressure sensor that detects a water pressure or a water detection sensor that detects contact of the electronic device with water.

4. The electronic device according to claim 1, wherein the processor causes the notifier to perform the notification by vibrating in the second notification mode.

5. The electronic device according to claim 4, wherein the processor
determines whether each of a plurality of notification conditions different from one another is satisfied, and
changes at least one of a vibration intensity or a vibration pattern of the notification by vibrating in accordance with a satisfied notification condition among the plurality of notification conditions.

6. The electronic device according to claim 4, wherein the processor causes the notifier to perform the notification further by emitting light in the second notification mode.

7. The electronic device according to claim 6, wherein the processor
determines whether each of a plurality of notification conditions different from one another is satisfied, and
changes at least one of a light intensity or a blinking pattern of the notification by emitting light in accordance with a satisfied notification condition among the plurality of notification conditions.

8. The electronic device according to claim 6, wherein the processor
determines whether each of a plurality of notification conditions different from one another is satisfied,
in response to determining that a first notification condition among the plurality of notification conditions is satisfied, causes the notifier to perform the notification by vibrating in the second notification mode, and
in response to determining that a second notification condition among the plurality of notification conditions is satisfied, the second notification condition being different from the first notification condition, causes the notifier to perform the notification by vibrating and emitting light in the second notification mode.

9. The electronic device according to claim 4, wherein the processor
in a case where the second notification mode is set as the notification mode of the notifier, determines whether a notification enhancement condition is satisfied, and
in response to determining that the notification enhancement condition is satisfied, switches the notification mode of the notifier from the second notification mode to a third notification mode that is the second notification mode with outputting sound added.

10. The electronic device according to claim 1, wherein the processor
determines whether an external device different from the electronic device is present, and
in response to determining that the electronic device is being used underwater and determining that the external device is not present, causes the notifier to perform the notification in the first notification mode.

11. A notification method that is performed by a processor of an electronic device including a notifier that is capable of performing notification pertaining to notification functions in a plurality of notification modes including a first notification mode in which the notifier outputs sound and a second notification mode in which the notifier outputs not sound but other, comprising:
setting notification priorities for the respective notification functions,
setting notification settings different from one another in notification intensity and/or notification pattern for the respective notification functions in the second notification mode;
determining whether the electronic device is being used underwater;
determining whether any of execution conditions for the respective notification functions is satisfied, and
in response to determining that the electronic device is being used underwater and determining that execution conditions for, among the notification functions, two or more notification functions are satisfied, causing the notifier to perform the notification pertaining to, among the notification functions whose execution conditions are satisfied, a notification function having a highest notification priority in the second notification mode.

12. The notification method according to claim 11, wherein the processor determines based on an output from a sensor whether the electronic device is being used underwater.

13. The notification method according to claim 11, wherein the processor causes the notifier to perform the notification by vibrating in the second notification mode.

14. The notification method according to claim 13, wherein the processor
determines whether each of a plurality of notification conditions different from one another is satisfied, and
changes at least one of a vibration intensity or a vibration pattern of the notification by vibrating in accordance with a satisfied notification condition among the plurality of notification conditions.

15. The notification method according to claim 13, wherein the processor causes the notifier to perform the notification further by emitting light in the second notification mode.

16. The notification method according to claim 15, wherein the processor
determines whether each of a plurality of notification conditions different from one another is satisfied, and
changes at least one of a light intensity or a blinking pattern of the notification by emitting light in accordance with a satisfied notification condition among the plurality of notification conditions.

17. A non-transitory computer-readable storage medium storing a program that causes, of an electronic device including a notifier that is capable of performing notification pertaining to notification functions in a plurality of notification modes including a first notification mode in which the notifier outputs sound and a second notification mode in which the notifier outputs not sound but other, a processor to:
set notification priorities for the respective notification functions;

set wherein notification settings different from one another in notification intensity and/or notification pattern for the respective notification functions in the second notification mode;

determine whether the electronic device is being used underwater;

determine whether any of execution conditions for the respective notification functions is satisfied; and in response to determining that the electronic device is being used underwater and determining that execution conditions for, among the notification functions, two or more notification functions are satisfied, cause the notifier to perform the notification pertaining to, among the notification functions whose execution conditions are satisfied, a notification function having a highest notification priority in the second notification mode.

18. The non-transitory computer-readable storage medium according to claim 17, wherein the program causes the processor to determine based on an output from a sensor whether the electronic device is being used underwater.

19. The non-transitory computer-readable storage medium according to claim 17, wherein the program causes the processor to cause the notifier to perform the notification by vibrating in the second notification mode.

20. The non-transitory computer-readable storage medium according to claim 19, wherein the program causes the processor to:

determine whether each of a plurality of notification conditions different from one another is satisfied; and change at least one of a vibration intensity or a vibration pattern of the notification by vibrating in accordance with a satisfied notification condition among the plurality of notification conditions.

21. The non-transitory computer-readable storage medium according to claim 19, wherein the program causes the processor to cause the notifier to perform the notification further by emitting light in the second notification mode.

* * * * *